US005605974A

United States Patent [19]
Carpenter et al.

[11] Patent Number: 5,605,974
[45] Date of Patent: Feb. 25, 1997

[54] PROCESS FOR THE PREPARATION OF A MODIFIED COPOLYMER AS A PIGMENT DISPERSANT FOR AQUEOUS COATING COMPOSITIONS

[75] Inventors: Clint W. Carpenter, Royal Oak; Zenon P. Czornij, Warren, both of Mich.

[73] Assignee: BASF Corporation, Southfield, Mich.

[21] Appl. No.: 751,027

[22] Filed: Aug. 28, 1991

[51] Int. Cl.6 .............................. C08F 16/02; C08F 16/12
[52] U.S. Cl. ................................... 525/328.2; 525/328.4; 525/452; 526/301
[58] Field of Search ....................... 525/123, 452, 525/328.2, 328.4; 528/44, 49, 76; 526/301

[56] References Cited

U.S. PATENT DOCUMENTS

| | | | |
|---|---|---|---|
| 2,978,432 | 4/1961 | Graalich et al. | 525/328.2 |
| 2,980,634 | 4/1961 | Melamed | 525/328.2 |
| 3,428,609 | 2/1969 | Chilvers et al. | 528/44 |
| 3,684,758 | 8/1972 | Honig et al. | 524/507 |
| 3,705,164 | 12/1972 | Honig et al. | 524/591 |
| 4,403,085 | 9/1983 | Christenson et al. | 528/45 |
| 4,518,724 | 5/1985 | Kuwajima et al. | 523/501 |
| 4,791,168 | 12/1988 | Salatin et al. | 524/601 |
| 4,794,147 | 12/1988 | Savino et al. | 525/440 |
| 4,918,129 | 4/1990 | Probst et al. | 524/457 |

Primary Examiner—Paul R. Michl
Assistant Examiner—John J. Guarriello
Attorney, Agent, or Firm—Frank Werner; Anne G. Sabourin

[57] ABSTRACT

The present invention is directed to a process for the preparation of modified copolymers as a pigment dispersant for coating compositions comprising the steps of a) polymerizing
  i) an ethylenically unsaturated monomer containing an isocyanate group with
  ii) ethylenically unsaturated monomer having no functional group capable of undergoing a reaction with said isocyanate group to form a copolymer with isocyanate and b) reating stepwise or simultaneously said isocyanate groups with
  iii) a polyalkylenglycol monoalkyl ether or amine and
  iv) optionally, a compound having one primary or one secondary amino group or another alcohol.

15 Claims, No Drawings

PROCESS FOR THE PREPARATION OF A MODIFIED COPOLYMER AS A PIGMENT DISPERSANT FOR AQUEOUS COATING COMPOSITIONS

FIELD OF THE INVENTION

The present invention is directed to a process for the preparation of a modified copolymer, more specifically it is directed to a modified copolymer as a pigment dispersant for an aqueous coating composition.

BACKGROUND OF THE INVENTION

Aqueous coating compositions are known and described for example in U.S. Pat. Nos. 4,794,147; 4,791,168; 4,518,724; and 4,403,055.

These aqueous coating compositions comprise a principal resin, optionally a crosslinker, pigments dispersed in a grind resin and other additives such as solvents, control agents fillers and the like.

Many pigments, especially organics, used in coating compositions for the automotive industry are hydrophobic. These pigments, when used in aqueous coating systems require the use of specialized grind resins with the additions of dispersing agents and solvents to overcome their incompatibility with water and poor ability to grind.

Pigment pastes are usually prepared by dispersing a pigment in a grinding resin in the presence of plasticizers, wetting agents, surfactants or other ingredients in a ball mill, sand mill, cowles mill or continuous mill until the pigment has been reduced to the desired particle size and is wetted by the resin or dispersed in it.

One disadvantage of pigment pastes is that they contain volatile organic compounds (VOC). Also, they often require a large amount of resin relative to pigment, and the resulting pigment pastes are not very concentrated. In addition, pastes made with conventional resins often do not have optimum color development.

It is therefore an object of the present invention to provide a process for the preparation of a pigment dispersant for an aqueous coating composition which does not need the use of volatile organic compounds and which provides stable aqueous pigment pastes or pigment dispersions. Another object is to increase the amount of pigments in the dispersion and simultaneously reduce the amount of resin. Yet another object of the invention is an aqueous coating composition comprising such pigment pastes or pigment dispersions.

SUMMARY OF THE INVENTION

The objects of the present invention are achieved with a process for the preparation of a copolymer as a pigment dispersant for aqueous coating compositions comprising the steps of a) polymerizing
  i) an ethylenically unsaturated monomer containing an isocyanate group with
  ii) other ethylenically unsaturated monomers having no functional group capable of undergoing a reaction with said isocyanate group to form a copolymer with isocyanate groups and b) reacting stepwise or simultaneously said isocyanate groups with
  iii) a compound selected from the group consisting of a polyalkyleneglycol monoalkyl ether, an amine-terminated polyalkyleneglycol monoalkyl ether and mixtures thereof and
  iv) optionally, a compound having one functional group capable of undergoing a reaction with said isocyanate group.

DETAILED DESCRIPTION OF THE INVENTION

In step (a) of the process of the present invention, a copolymer with isocyanate groups is formed by polymerizing i) from about 5 to about 50% by weight, preferably from about 20 to about 30% by weight of an ethylenically unsaturated monomer containing an isocyanate group with ii) from about 50 to about 95% by weight, preferably from about 70 to about 80% by weight of other ethenically unsaturated monomers having no functional groups capable of undergoing a reaction with said isocyanate group.

Suitable ethylenically unsaturated monomers containing an isocyanate group (i) comprise dimethyl-meta-isopropenyl benzyl isocyanate, vinylisocyanate, isocyanatoethyl (meth)acrylate, isopropenyl isocyanate, and mixtures thereof. Preferred is dimethyl-meta-isopropyl benzyl isocyanate.

Ethylenically unsaturated monomers (ii) are suitable if they have no functional group capable of undergoing a reaction with said isocyanate group of monomers (i). Suitable monomers (ii) comprise vinyl aromatics such as styrene, alpha-methylstyrene, vinyl toluene, tert-butyl styrene, halogenated vinyl benzenes such as chloro styrene, acrylic or methacrylic aromatic esters such as phenyl methacrylate or para-tolyl acrylate, aralkyl esters of acrylic or methacrylic acid such as phenethyl acrylate or 3-phenylpropyl methacrylate, aryloxyalkyl esters of acrylic or methacrylic acid such as phenoxyethyl methacrylate, aromatic-containing acrylamides and methacrylamides such as N-phenylacrylamide and mixtures thereof. Other suitable monomers are acrylic or methacrylic alkyl esters derived from alcohols haveing 1 to about 20 carbon atoms, or vinyl monomers. [The expression (meth)acrylate with parentheses as used herein includes methacrylate and acrylate. Suitable examples are methyl (meth)acrylate, ethyl (meth)acrylate, propyl (meth)acrylate, n-butyl (meth)acrylate, isobutyl (meth)acrylate, tert-butyl (meth)acrylate, cyclohexyl (meth)acrylate and 2-ethylhexyl (meth)acrylate. Also suitable are maleic acid and fumaric acid dialkyl esters in which the alkyl groups have 1 to 20 carbon atoms. Other monomers are vinyl chloride, (meth)acrylamide and (meth)acrylonitrile, N-alkyl maleimides, N-aryl maleimides and acrolein.]

Preferred are styrene, phenyl (meth)acrylate, n-butyl (meth)acrylate, cyclohexyl (meth)acrylate, 2-ethylhexyl (meth)acrylate, and (meth)acrylonitrile.

Copolymerization is carried out using conventional techniques such as heating the monomers in the presence of a polymerization initiating agent and optionally chain transfer agents. The copolymerization may be carried out in bulk or solution. For the present invention it is preferred to have some solvent present to act as a cosolvent during dispersion. Solvents for solution polymerization should not have functional groups capable to react with the isocyanate groups of component (i).

Suitable solvents comprise ketones, such as methyl ethyl ketone, methyl propyl ketone and acetone; esters, such as butyl acetate and pentyl propionate; ethers, such as diethylene glycol dimethyl ether, dioxane, tetrahydrofuran;

N-methyl pyrrolidone, ketoesters, aromatic hydrocarbons alkanes, cyclic alkanes and mixtures thereof.

Preferred solvents are ketones such as methyl ethyl ketone, methyl propyl ketone, and methyl isobutyl ketone methy amyl ketone and mixtures thereof.

Typical initiators are peroxides such as dialkyl peroxides, peroxyesters, peroxydicarbonates, diacyl peroxides, hydroperoxides, and peroxyketals and azo compounds such as 2,2'-azobis(2-methylbutanenitrile) and 1,1'-azobis (cyclohexanecarbonitrile).

Typical chain transfer agents are mercaptans such as octyl mercaptan, n- or tert.-dodecyl mercaptan; halogenated compounds; thiosalicylic acid, mercaptoacetic acid, mercaptoethanol, buten-1-ol, and dimeric alpha-methyl styrene. Mercaptans are preferred.

The reaction is usually carried out at temperatures from about 20° C. to about 200° C. The reaction may conveniently be done at the temperature at which the solvent or solvent mixture refluxes, although with proper control a temperature below the reflux may be maintained. The initiator should be chosen to match the temperature at which the reaction is carried out, so that the half-life of the initiator at that temperature should preferably be between one minute and thirty minutes.

The solvent or solvent mixture is generally heated to the reaction temperature and the monomer and initiator(s) are added at a controlled rate over a period of time, usually between 2 and 6 hours. A chain transfer agent or additional solvent may be fed in also at a controlled rate during this time. The temperature of the mixture is then maintained for a period of time to complete the reaction. Optionally, additional initiator may be added to ensure complete conversion.

The NCO number of the copolymer is from about 0.3 meq/g NV to 2.0 meq/g NV, preferably from about 0.9 meq/g NV to about meq/g NV.

The copolymers of step (a) have a weight average molecular weight determined by GPC versus polystyrene standards of from about 3,000 to about 25,000, preferably from about 4,000 to about 10,000.

In step (b) the isocyanate groups of the copolymer of step (a) are reacted stepwise or simultaneously with (iii) a polyalkylene glycol monoalkyl ether or an amine-terminated polyalkylene glycol monoalkyl ether and (iv) optionally, a compound having one functional group capable of undergoing a reaction with said isocyanate group.

The polyalkylene glycol monoalkyl ether (iii) is preferably formed from monoalcohol initiated polymerization of ethylene oxide, propylene oxide and mixtures thereof with up to 30% by weight propylene oxide. Starting monoalcohols are $C_1$–$C_{18}$ alcohols like methanol, ethanol, n-propanol, i-propanol hexanol, decanol, undercanol and etheralcohols like methoxyethanol, butoxyethanol and the like.

The amine-terminated polyalkyleneglycol monoalkyl ether is preferably formed from the amination of polyalkylene glycol monoalkylether.

Preferred is polyethylene glycol monomethyl-ether.

Suitable compounds (iv) contain one primary or one secondary amino group or one alcohol group.

Examples of compounds (iv) $C_1$–$C_{36}$ mono or dialkyl amines like ethyl amine, n-propyl amine, i-propyl amine, n-hexyl amine, 2-ethyl hexyl amine, n-decyl amine, stearyl amine, diethyl amine, dihexyl amine, di stearyl amine; $C_4$–$C_{18}$ mono or dicycloalkyl amine like cyclopentyl amine, cyclohexyl amine, dicyclohexyl amine, heterocyclic $C_4$–$C_{18}$ amines like pyrrolidine, piperidine and morpholine; aromatic $C_6$–$C_{18}$-amines like aniline, p-toluidine, o-toluidine, diphenyl amine, indole, indoline; araliphatic $C_7$–$C_{18}$ amines like benzyl amine, dibenzylamine, 2-phenyl ethylamine; $C_2$–$C_{36}$ ether mono and di alkanol amines like ethanol amine, diethanol amine, i-propanol amine, n-hexanol amine, n-undecanol amine, 3-aminopropanol, aminocyclohexanol, 2-(2-aminoethoxy) ethanol; $C_1$–$C_{36}$ alcohols such as methanol, ethanol, propanol, i-propanol, n-butanol, isobutanol, n-hexanol, cyclohexanol, 2-ethyhexanol; $C_3$–$C_{36}$ ether alcohols such as methoxyethanol, butoxyethanol, 1-butoxy-2-propanol, (butoxyethoxy)ethanol, and solketal.

Preferred are mono and dialkanolamines, particularly ethanolamine, diethanolamine, and 3-amino propanol.

As stated above, the components (iii) and (iv) may be reacted stepwise or simultaneously with the isocyanate groups of the copolymer of step (a). Preferred is the stepwise reaction of first component (iii) and second component (iv).

The reaction is usually carried out at temperatures from about 20° C. to 150° C., preferably from about 50° C. to about 130° C.

The molar ratio of the hydrogen functionality of component (iii) and (iv) to the isocyanate group of the copolymer of step (a) is from about 0.8 to about 1.3, preferably from about 1.0 to about 1.3.

The reaction may be carried out in the presence of the same organic solvents which have been used in step (a) and in the presence of a catalyst such as organic tin compounds and/or tertiary amine.

The final copolymers have a weight average molecular weight of from about 4,000 to about 30,000, preferably from about 5,000 to about 12,000.

For the preparation of the pigment paste, the pigments or dyestuffs are dispersed in a solution of the copolymer in water with optional cosolvent and group in a ball mill, sand mill, cowles mill, attritor, or continuous mill.

Examples of the dye stuffs or pigments may be inorganic or organic, for example, graphite, carbon black, zinc chromate, strontium chromate, barium chromate, lead chromate, lead cyanide, titanium dioxide, zinc oxide, iron oxide, cadmium sulfide, iron oxide, aluminum flakes, mica flakes, zinc sulfide, phthalocyanine complexes, naphthol red, carbazole violet, perylene reds, quinacridones and halogenated thioindigo pigments, among others.

For the preparation of the pigment paste, the pigments or dyestuffs are dispersed in a solution of the copolymer in water with optional cosolvent and ground in ball mill, etc.

The pigment paste has a concentration of from about 10 to about 60% by weight of pigments based on the total weight of the pigment paste.

The pigment paste of the present invention is added to water dispersible film forming resin such as those described in U.S. Pat. Nos. 4,794,147, 4,791,168, 4,518,724, 4,403,055, and U.S. Appl. Ser. No. 07/417,998.

The concentration of the pigment paste is from about 3 to about 25% by weight depending on pigmentation desired based on the total weight of the aqueous coating composition.

The principle resin is known in the art and described for example in U.S. Pat Nos. 4,794,147, 4,791,168, 4,518,724 and 4,403,055, and patent application Ser No. 07/417,998.

Preferred are principal resins like those described in 4,794,147, 4,791,168 and U.S. application Ser. No. 07/417,998.

Coating compositions of the present invention are formulated by mixing the pigment dispersions of the present invention, along with other components, into water dispersible base coat compositions which are sprayed or electrostatically deposited onto metal or plastic substrates such as, for example, automotive vehicle bodies. As discussed above, a water dispersible film forming resin such as a water dispersible non-ionic polyurethane resin of the type disclosed in U.S. Pat. No. 4,794,147, a water dispersible anionic polyurethane resin of the type disclosed in U.S. Pat. No. 4,791,168, or a water dispersible acrylic resin of the type disclosed in U.S. Pat. Nos. 4,403,085 and 4,518,724 is mixed with an aminoplast resin, polyisocyanate, or other suitable cross-linking agent, one or more rheology control agents if desired, water, and a small amount of organic solvent if needed. Other agents may be included such as various fillers, surfactants, plasticizers, stabilizers, wetting agents, defoamers, adhesion promoters, and catalysts in minor amounts.

Additives may be used like organic solvents, catalysts, wetting agents, conditioning agents, thickeners, rheology control agents, antioxidants, surfactants, leveling agents, or mixtures thereof.

The basecoat compositions containing the pigment dispersions of the present invention are applied to a metal or plastic substrate in one or more coats using, for example, an air atomizer (Binks Model 60 spray gun, available from the Binks manufacturing Corporation, Franklin Park, Ill.), or by using other conventional spray methods known in the art.

After being deposited, the basecoat compositions may be flash dried at a temperature sufficient to remove a portion of the solvent, but below that sufficient to cure the applied coating, typically temperatures within the range of from room temperature to about 145° F. (63° C.). After the first basecoat is deposited, a second basecoat and subsequent layer of basecoat, if needed or desired, can be deposited over the first either with or without flash drying. A clear, transparent top coat layer is then subsequently applied over the last base coat layer. Any known unpigmented or transparently pigmented coating agent is, in principle, suitable for use as the top coat material.

After the clear coat is applied over the base coat layer(s), the multi-layer coating is then baked to cross-link and cure the polymeric materials and to drive the small amount of residual water and/or solvent from the coating layer(s). This baking step generally involves the heating of the coated substrate for periods of from about 10 to about 60 minutes and temperatures ranging between about 150° F. (66° C.) and 300° F. (149° C.). The baking step cures the multi-layer coating to a hard, durable film.

The invention provides good pigment pastes or pigment dispersions, decreased pigment settling characteristics in the aqueous coating composition, a reduced amount of the total pigment, a greatly reduced amount of grind resin and higher concentration of pigment in the paste and a low VOC-coating. The coating of the coated article exhibit good appearance, hiding, gloss, and film thickness.

EXAMPLES

Example 1

Preparation of Isocyanate Functional Acrylic Copolymer 1

427.8 g (4.97 mol) of methyl propyl ketone was charged to a reaction vessel fitted with stirrer and condensor. The vessel was heated to reflux temperature and maintained at reflux for the duration of the reaction. A blend consisting of 495.0 g (4.41 mol) styrene, 405.6 g (2.85 mol) butyl methacrylate, and 382.6 g (1.90 mol) 1-(1-isocyanato-1-methyl ethyl)-3-(1-methyl ethenyl) benzene, hereafter referred to as TMI, was slowly added over a period of three hours. 64.1 g of tert-butyl perocotoate was added to the monomer blend to initiate the vinyl polymerization. 32.2 g of initiator along with 123.0 g of methyl propyl ketone were added one half hour after the addition of monomer was complete. The mixture was heated for an additional 1.5 hours and then cooled and collected for further modification.

Example 2

Preparation of Isocyanate Functional Acrylic Copolymer 2

231.3 g (2.03 mol) of methyl amyl ketone was charged to a reaction vessel fitted with stirrer and condensor. The vessel was heated to reflux temperature and maintained at reflux for the duration of the reaction. A blend consisting of 94.8 g (0.91 mol) styrene, 160.7 g (1.13 mol) butyl methacrylate, 144,8 g (1.13 mol) butyl acrylate, and 382.6 g (1.90 mol) TMI, was slowly added over a period of three hours. 67.2 g of 50% active tert-butyl peroxy acetate was added to the monomer blend to initiate the vinyl polymerization. 33.6 g of 50% active initiator along with 55.0 g methyl amyl ketone were added one half hour after the addition of monomer was complete. The mixture was heated for an additional 1.5 hours and then cooled and collected for further modification.

Example 3

Preparation of Isocyanate Functional Acrylic Copolymer 3

100.0 g (0.86 mol) xylene was charged to a reaction vessel fitted with stirrer and condensor. The vessel was heated to reflux temperature and maintained at reflux for the duration of the reaction. A blend consisting of 100.0 g (960 mmol) styrene, 100.0 g (703 mmol) butyl methacrylate, and 25.0 g (124 mmol) TMI, was slowly added over a period of three hours. 25.0 g of tert-amyl perocotoate was added to the monomer blend to initiate the vinyl polymerization. 12.5 g of initiator along with 25.0 g of xylene were added one half hour after the addition of monomer was complete. The mixture was heated for an additional 1.5 hours and then cooled and collected for further modification.

Example 4

Preparation of Isocyanate Functional Acrylic Copolymer 4

251.0 g (2.51 mol) of methyl amyl ketone was charged to a reaction vessel fitted with stirrer and condensor. The vessel was heated to reflux temperature and maintained at reflux for the duration of the reaction. A blend consisting of 294.8 g (1.60 mol) 2-ethyl-hexyl acrylate, 269.2 g (1.60 mol) cyclohexyl methacrylate, and 322.0 g (1.60 mol) TMI, was slowly added over a period of three hours. 88.6 g of 50% active tert-butyl peroxy acetate was added to the monomer blend to initiate the vinyl polymerization. 44.3 g of 50% active initiator along with 62.2 g methyl amyl ketone were added one half hour after the addition of monomer was complete. The mixture was heated for an additional 1.5 hours and then cooled and collected for further modification.

Example 5

Preparation of Modified Copolymer (Grind Resin)

1279.5 g (0.91 mol; average molecular weight of 1400) of methoxy polyethylene glycol and 1929.7 g of the isocyanate-functional acrylic prepared in accordance with Example 1 were charged to a reaction vessel fitted with a stirrer and condensor. The mixture was heated to reflux and maintained at reflux for not more than one half hour. At the end of this time, the mixture was titrated and the result indicated that all of the methoxy polyethylene glycol had reacted with the isocyanate groups. The remainder of the isocyanate functionality was capped with 53.4 g (0.87 mol) monoethanolamine which was added while the mixture was stirred and the temperature was approximately 40° C. The temperature then rose to 63° C. and then subsided. When the exothermic reaction had ceased, the mixture was titrated. Titration revealed no remaining NCO functionality. The material was subsequently dispersed with 80.0 g (4.40 mol) of deionized water.

Example 6

Red Pigment Paste 1

A red pigment paste was prepared by adding 16.21 parts by weight perylene pigment (C.I. Pigment Red 179) to a stirred mixture consisting of 2.51 parts by weight grind resin prepared in accordance with the example given above, 74.00 parts by weight deionized water, and 7.28 parts by weight ethylene glycol monobutyl ether. The resultant mixture was stirred on cowles for about thirty minutes and milled in an attritor for four hours.

Example 7

Red Pigment Paste 2 (Control)

A red pigment paste was prepared by mixing 21.00 parts by weight anionic polyurethane resin, 5.91 parts by weight Cymel® 327 methylated melamine-formaldehyde resin, and 7.68 parts by weight perylene pigment (C.I. Pigment Red 179). After stirring this mixture for thirty minutes, 54.89 parts by weight anionic polyurethane resin and 8.52 parts by weight deionized water were added with mixing. The resultant mixture was milled in an attritor for four hours.

The anionic polyurethane resin was prepared according to the teachings of U.S. Pat. No. 4,791,168, the contents of which are incorporated herein by reference.

Example 8

Red Pigment Paste 3

A red pigment paste was prepared by adding 14.99 parts by weight quinacridone pigment (C.I. Pigment Red 202) to a stirred mixture consisting of 6.96 parts by weight grind resin prepared in accordance with the example given above, 71.04 parts by weight deionized water, and 7.01 parts by weight ethylene glycol monobutyl ether. The resultant mixture was stirred on cowles for about thirty minutes and milled in an attritor for four hours.

Example 9

Red Pigment Paste 4

A red pigment paste was prepared by adding 13.49 parts by weight quinacridone pigment (C.I. Pigment Red 202) to a stirred mixture consisting of 5.81 parts by weight grind resin prepared in accordance with the example given above, and 80.70 parts by weight deionized water. The resultant mixture was stirred on cowles for about thirty minutes and milled in an attritor for four hours.

Example 10

Red Pigment Paste 5 (Control)

A red pigment paste was prepared by mixing 24.14 parts by weight anionic polyurethane resin, 6.57 parts by weight Cymel® 327 methylated melamine-formaldehyde resin, and 7.57 parts by weight quinacridone pigment (C.I. Pigment Red 202). After stirring this mixture for thirty minutes, 61.72 parts by weight anionic polyurethane resin were added and the resultant mixture stirred for one hour then milled in an attritor for four hours. The anionic polyurethane resin was prepared according to the teachings of U.S. Pat. No. 4,791,168.

Example 11

Red Pigment Paste 6

A red pigment paste was prepared by adding 47.62 parts by weight diketopyrrolopyrrole pigment (C.I. Pigment Red 254) to a stirred mixture consisting of 3.17 parts by weight grind resin prepared in accordance with the example given above, 45.0 parts by weight deionized water, and 4.21 parts by weight ethylene glycol monobutyl ether. The resultant mixture was stirred on cowles for about 30 minutes and milled on an attritor for one hour.

Example 12

Red Pigment Paste 7 (Control)

A red pigment paste was prepared by mixing 22.02 parts by weight diketopyrrolopyrrole pigment (C.I. Pigment Red 254) and 53.11 parts by weight nonionic polyurethane grind resin. After stirring this mixture for 30 minutes, 20.72 parts by weight nonionic polyurethane grind resin and 4.15 parts by weight deionized water were added and the resultant mixture milled on an attritor for two hours.

The nonionic polyurethane resin was prepared according to the teachings of U.S. Pat. No. 4,794,147, the contents of which are incorporated herein by reference.

Example 13

Coating Composition 1

A coating composition was prepared which contained dispersant stabilized organic red pigment grinds prepared in accordance with the present invention above.
Red iron oxide tint paste A red iron oxide pigment paste was prepared by mixing 14.74 parts by weight anionic polyurethane resin, 10.39 parts by weight Cymel® 327 methylated melamine-formaldehyde resin, 42.78 parts by weight deionized water, 7.64 parts by weight ethylene glycol monobutyl ether, and 23.72 parts by weight red iron oxide pigment. The resultant mixture was stirred on cowles for about thirty minutes and milled in an attritor for four hours.

The anionic polyurethane resin was prepared in accordance with the teachings of U.S. Pat. No. 4,791,168.

Black tint paste

A black pigment paste was prepared by mixing 19.27 by weight anionic polyurethane resin, 13.82 parts by weight Cymel® 327 methylated melamine-formaldehyde resin, 43.56 parts by weight deionized water, 17.14 parts by weight ethylene glycol monobutyl ether, and 6.29 parts by weight Monarch 900 carbon black pigment (Cabot Corporation, 125 High Street, Boston, Mass. 02110). The resultant mixture was stirred on cowles for about thirty minutes and milled in an attritor for four hours.

The anionic polyurethane resin was prepared in accordance with the teachings of U.S. Pat. No. 4,791,168.

Mica Pigment Dispersion 0.63 parts by weight of Super Copper 359Z iron oxide coated mica (The Mearl Corporation, 41 East 42nd Street, New York, N.Y. 10532) and 0.21 parts by weight of Afflair® 9300 Gold iron oxide coated mica (EM Industries, 5 Skyline Drive, Hawthorne, N.Y. 10532) were slurried into a resin solution prepared by mixing 5.16 parts by weight of branched polyester resin prepared in accordance with the teachings of U.S. Pat. No. 4,791,168 and 3.83 parts by weight of ethylene glycol monobutyl ether.

The resin solution was stirred vigorously enough to form a vortex and each mica was slowly added into the vortex. When the addition was complete, 2.22 parts by weight of a 5% aqueous solution of dimethylethanolamine were added.

| Coating Composition 1 | |
|---|---|
| Ingredient | Parts by weight |
| 1. 2% dispersion of Laponite RD[1] in water | 22.61 |
| 2. Cymel® 327 methylated melamine formaldehyde resin [2] | 4.10 |
| 3. Ethylene glycol monobutyl ether | 1.03 |
| 4. Anionic polyurethane resin dispersion[3] | 38.31 |
| 5. Red pigment paste 1 (Example 6) | 16.55 |
| 6. Red pigment paste 3 (Example 8) | 2.22 |
| 7. Red iron oxide tint (as above) | 1.56 |
| 8. Black tint (as above) | 1.26 |
| 9. Tinuvin 1130 UVA[4] | 0.31 |
| 10. Iron oxide coated mica[5] | 0.63 |
| 11. Iron oxide coated mica[6] | 0.21 |
| 12. Ethylene glycol monobutyl ether | 3.83 |
| 13. Branched polyester resin[7] | 5.16 |
| 14. 5% aqueous dimethylethanolamine | 2.22 |
| | 100.00 |

[1]Synthetic bentonite clay from Laporte, Incorporated, Park 80 West, Plaza 11, Saddle Brook, NJ 07662.
[2]Melamine crosslinker from American Cyanamid Corporation, 1 Cyanamid Plaza, Wayne, NJ 07470.
[3]The anionic polyurethane resin was prepared in accordance with the teachings of U.S. Pat. 4,791,168.
[4]Ultraviolet light absorber from Ciba-Geigy Corporation, Additives Division, 7 Skyline Drive, Hawthorne, NY 10532.
[5]Super Copper 359Z iron oxide coated mica from The Mearl Corporation, 41 East 42nd Street, New York, NY 10017.
[6]Afflair 9300 Gold iron oxide coated mica from EM Industries, 5 Skyline Drive, Hawthorne, NY 10532.
[7]The branched polyester resin was prepared in accordance with the teachings of U.S. Pat. 4,791,168.

Components 2 and 3 were premixed, then added to component 1 with rapid stirring. To this mixture were then added, successively with rapid stirring, components 4–9. Components 10–14 were premixed and then added to the mixture with stirring. After mixing of all components, stirring was continued for about one hour, after which the coating was filtered into a container and capped for later use.

Example 14

Coating Composition 2 (Control)

A coating composition was prepared having the same pigment concentrations as in Example 13, but the organic red pigment grinds were prepared using the anionic polyurethane grind resin according to Example 7 and Example 10. The red iron oxide tint paste, black tint paste, and mica dispersion were prepared as in Example 13.

| Coating Composition 2 | |
|---|---|
| Ingredient | Parts by weight |
| 1. 2% dispersion of Laponite RD[1] in water | 24.14 |
| 2. Cymel® 327 methylated melamine | 1.75 |
| 3. Ethylene glycol monobutyl ether | 0.43 |
| 4. Anionic polyurethane resin dispersion[3] | 19.17 |
| 5. Red pigment paste 2 (Example 7) | 34.94 |
| 6. Red pigment paste 5 (Example 10) | 4.40 |
| 7. Red iron oxide tint (as above) | 1.56 |
| 8. Black tint (as above) | 1.26 |
| 9. Tinuvin 1130 UVA[4] | 0.31 |
| 10. Iron oxide coated mica[5] | 0.63 |
| 11. Iron oxide coated mica[6] | 0.21 |
| 12. Ethylene glycol monobutyl ether | 3.83 |
| 13. Branched polyester resin[7] | 5.16 |
| 14. 5% aqueous dimethylethanolamine | 2.22 |
| | 100.00 |

[1]Synthetic bentonite clay from Laporte, Incorporated, Park 80 West, Plaza 11, Saddle Brook, NJ 07662.
[2]Melamine crosslinker from American Cyanamid Corporation, 1 Cyanamid Plaza, Wayne, NJ 07470.
[3]The anionic polyurethane resin was prepared in accordance with the teachings of U.S. Pat. 4,791,168.
[4]Ultraviolet light absorber from Ciba-Geigy Corporation, Additives Division, 7 Skyline Drive, Hawthorne, NY 10532.
[5]Super Copper 359Z iron oxide coated mica from The Mearl Corporation, 41 East 42nd Street, New York, NY 10017.
[6]Afflair 9300 Gold iron oxide coated mica from EM Industries, 5 Skyline Drive, Hawthorne, NY 10532.
[7]The branched polyester resin was prepared in accordance with the teachings of U.S. Pat. 4,791,168.

The procedure for the preparation of this coating composition is as described in Example 13.

Example 15

Coating Composition 3

A coating composition was prepared which contained the dispersant stabilized diketopyrrolopyrrole pigment grinds prepared in accordance with the present invention above.

| Coating Composition 3 | |
|---|---|
| Ingredient | Parts by weight |
| 1. 2% dispersion of Laponite RD[1] in water | 20.29 |
| 2. Resimene® 747 methylated melamine formaldehyde resin[2] | 10.34 |
| 3. Ethylene glycol monobutyl ether | 2.58 |
| 4. Nonionic polyurethane resin dispersion[3] | 48.38 |
| 5. Red pigment paste 6 (Example 11) | 16.88 |
| 6. Nacure 2500 blocked acid catalyst[4] | 1.63 |
| | 100.00 |

[1]Synthetic bentonite clay from Laporte, Incorporated, Park 80 West, Plaza 11, Saddle Brook, NJ 07662.
[2]Melamine crosslinker from Monsanto Corporation, 800 North Lindbergh Boulevard, St. Louis, MO 63167.

-continued

Coating Composition 3

| Ingredient | Parts by weight |
| --- | --- |

[3]The nonionic polyurethane resin was prepared in accordance with the teachings of U.S. Pat. 4,794,147.
[4]Blocked acid catalyst from King Industries, P.O. Box 588, Science Road, Norwalk, CT 06852.

Components 2 and 3 were premixed, then added to component 1 with rapid stirring. To this mixture were then added, successively with rapid stirring, components 4–6. After mixing of all components, stirring was continued for about one hour, after which the coating was filtered into a container and capped for later use.

Example 16

Coating Composition 4 (Control)

A coating composition was prepared having the same pigment concentration as in Example 15, but the diketopyrrolopyrrole pigment grind was prepared using the nonionic polyurethane grind resin according to Example 12.

Coating Composition 4

| Ingredient | Parts by weight |
| --- | --- |
| 1. 2% dispersion of Laponite RD[1] in water | 21.66 |
| 2. Resimene ® 747 methylated melamine formaldehyde resin[2] | 11.03 |
| 3. Ethylene glycol monobutyl ether | 2.76 |
| 4. Nonionic polyurethane resin dispersion[3] | 23.96 |
| 5. Red pigment paste 7 (Example 12) | 38.96 |
| 6. Nacure 2500 blocked acid catalyst[4] | 1.53 |
| | 100.00 |

[1]Synthetic bentonite clay from Laporte, Incorporated Park 80 West, Plaza 11, Saddle Brook, NJ 07662.
[2]Melamine crosslinker from Monsanto Corporation, 800 North Lindbergh Boulevard, St. Louis, MO 63167.
[3]The nonionic polyurethane resin was prepared in accordance with the teachings of U.S. Pat. 4,794,147.
[4]Blocked acid catalyst from King Industries, P.O. Box 588, Science Road, Norwalk, CT 06852.

The procedure for the preparation of this coating composition is as described in Example 15.

Application of the Coating Composition

The basecoat composition containing the dispersant stabilized pigment grinds of the present invention are applied to metal or plastic substrate in one or more coats using, for example, an air atomizer (Binks Model 62) spray gun, or by using other conventional spray methods known in the art.

After the basecoat layer containing the dispersant stabilized pigment grinds has been applied, it may be heated at a temperature and for a time sufficient to cure it to a hard, durable finish. Typically, temperatures of about 150° F. (66° C.) and 300° F. (149° C.) and times ranging between 10 minutes to 60 minutes suffice. Alternatively, subsequent coating layers may be applied onto the uncured basecoat layer. In the latter case, the basecoat layer may be flash dried at a temperature sufficient to remove a portion of the solvent, but below that sufficient to cure the applied coating, typically temperatures within the range of 80° F. (25° C.) to 145° F. (63° C.). After the first basecoat layer is deposited, a second and subsequent layers of topcoat, if desired, can be applied over the first with or without curing or flash drying.

A clear, transparent topcoat layer may be subsequently applied over the last basecoat layer. Any known unpigmented or transparently pigmented coating agent is, in principle, suitable for use as the topcoat material.

The clearcoat may be applied over the uncured or previously cured basecoat layer(s). When the clearcoat is applied over a flash-dried, uncured basecoat layer or layers, the multi-layer coating is then baked to cross-link and cure the polymeric materials and to drive the small amount of residual water and/or solvent from the coating layer(s). This baking step generally involves the heating of the coated substrate for periods of from about 10 to about 60 minutes and temperatures ranging between about 150° F. (66° C.) and 300° F. (149° C.). The baking step cures the multilayer coating to a hard, durable film.

The enhanced color development and stability of coatings made with pastes prepared using the grind resins of the present invention was noted in comparing the coating composition of Example 13 to the coating composition of Example 14. The film derived from the coating composition of Example 13 showed an enhanced metallic effect as the result of greater transparency in the red pigments and the paint system itself showed no settling after 15 days. The enhanced color development is more clearly shown by the comparison of the masstone coating compositions of Example 15 and Example 16. Measurements of the color of the masstones in cured basecoat/clearcoat films showed that the masstone of Example 15 showed a substantially brighter and more intense color.

| Color Measurements of C.I. Pigment Red 254 Masstones | | | |
| --- | --- | --- | --- |
| Coatings Composition | L* (brightness) | +a* (red index) | +b* (yellow index) |
| Composition 3 (Ex. 15) | 42.56 | 50.70 | 29.83 |
| Composition 4 (Ex. 16) | 42.25 | 50.16 | 29.27 |

The amount of volatile organic compounds needed in the preparation of waterborne pigment pastes can be dramatically reduces by the use of the grind resin of the present invention. This is shown in the case of the red pigment paste of Example 9, which contains less than 2% volatile organic compounds and has a shelf life of at least 45 days. Even the pigment paste of Example 8 which was made with additional cosolvent had only 9% volatile organic compounds. In contrast, the red pigment paste of Example 10 contains approximately 14% volatile organic compounds.

I claim:

1. A process for the preparation of modified copolymers as pigment dispersants for coating compositions, comprising the steps of
   a) polymerizing
      i) an ethylenically unsaturated monomer containing an isocyanate group with
      ii) an ethylenically unsaturated monomer having no functional group capable of undergoing a reaction with said isocyanate group to form a copolymer with isocyanate groups and
   b) reacting stepwise or simultaneously said isocyanate groups with
      iii) a polyalkyleneglycol monoalkyl ether or amine terminated polyalkylene glycol monoalkyl ether and
      iv) optionally, a compound having one primary or one secondary amino group or another alcohol.

2. A process according to claim 1, wherein the molar ratio of the isocyanate groups to the sum of compounds (iii) and (iv) is from about 0.8 to about 1.3:1.

3. A process according to claim 1, wherein the molar ratio of components (iii) to (iv) is from about 0.1 to 5:1.

4. A process according to claim 1, wherein the monomer (i) is selected from the group consisting of dimethyl-meta-isopropenyl benzyl isocyanate, vinylisocyanate, isocyanato-ethyl (meth)acrylate, isopropenyl isocyanat and mixtures thereof.

5. A process according to claim 1, wherein the monomer (ii) is selected from the group consisting of vinyl aromatics (meth)acrylic ester, (meth)acrylamide, maleic dialkylester, fumaric dialkylester, vinyl chloride, acrylonitrile N-alkyl maleimide, N-aryl maleimide, acrolein and mixtures thereof.

6. A process according to claim 1, wherein the monomer (ii) is selected from the group consisting of vinyl aromatics (meth)acrylic ester, acrylonitrile and mixtures thereof.

7. A process according to claim 1, wherein the polyalkyleneglycol monoalkyl ether (iii) (is a polyethylenglycol mono alkyl ether.

8. A process according to claim 1, wherein the compound (iv) is selected from the group consisting of $C_1$–$C_{36}$ mono or di alkyl amines, $C_4$–$C_{18}$ mono dicycloalkyl amines heterocyclic $C_4$–$C_{18}$ amines, aromatic $C_6$–$C_{18}$ amines, araliphatic $C_7$–$C_{18}$ amines, $C_2$–$C_{36}$ mono and dialkanol amines and mixtures thereof.

9. A process according to claim 1, wherein the compound (iv) is selected from the group consisting of ethyl amine, n-propyl amine, i-propyl amine, n-hexyl amine, 2-ethyl hexyl amine, n-decyl amine, stearyl amine, diethyl amine, dihexyl amine, distearyl amine; cyclopentyl amine, cyclohexyl amine, dicyclohexyl amine; pyrrolidine, piperidine and morpholine; aniline, p-toluidine, o-toluidine, diphenyl amine, indole, etc.; benzyl amine, dibenzylamine; ethanol amine, diethanoi amine, i-propanol amine, n-hexanol amine, n-undecanol amine and mixtures thereof.

10. Modified copolymers obtainable by the process according to claim 1.

11. An aqueous pigment dispersion comprising a modified copolymer according to claim 10.

12. An aqueous coating composition comprising a modified copolymer according to claim 10.

13. An article coated with an aqueous coating composition according to claim 12.

14. A process according to claim 1, wherein in step (a) is used:

about 5 to about 50% by weight (i); and about 50 to about 95% by weight (ii).

15. The process of claim 1, wherein step (a) of polymerizing monomers i) and ii) is accomplished by solution polymerization.

* * * * *